May 8, 1956  G. R. PAINE  2,744,339
RADAR SIMULATOR
Filed July 24, 1952  5 Sheets-Sheet 1

INVENTOR.
GEORGE R. PAINE
BY
ATTORNEY.

May 8, 1956  G. R. PAINE  2,744,339
RADAR SIMULATOR
Filed July 24, 1952  5 Sheets-Sheet 3

INVENTOR.
GEORGE R. PAINE
BY
*H. S. Mackey*
ATTORNEY.

Fig. 6

INVENTOR.
GEORGE R. PAINE

United States Patent Office 2,744,339
Patented May 8, 1956

2,744,339

RADAR SIMULATOR

George R. Paine, Pleasantville, N. Y., assignor to General Precision Laboratory Incorporated, a corporation of New York Application July 24, 1952, Serial No. 300,669

10 Claims. (Cl. 35—10.4)

This invention relates to instruments for simulating radar operation in connection with a plurality of targets. The invention more specifically relates to a simulator in which targets are simulated and their movements are controlled in all three dimensions of space and in which indications of simulated radar target echoes are exhibited on radar type displays.

In training operators of radar equipment it becomes expedient, when the radar equipment is large and cumbersome, to employ simulating instruments which can be made much smaller than the radar equipment. More important, in place of employing fleets of aircraft to serve as radar targets it is far simpler to generate target signals electronically at the training instrument and to introduce these electrically to the simulator. Both generation and transmission of radio or radar energy are thus entirely eliminated, and the signals simulating aircraft targets are locally generated and used. In thus generating the target signals, the courses and speeds of a plurality of simulated radar target aircraft are continuously under control of the training instructor.

The instrument of this invention employs a plurality of target signal generators. Each generator has three manually operated adjustments to control orthogonally the position in space of one simulated target, the three coordinates employed being the east-west position, north-south position and vertical height. The signal generator may also have controls for making the simulated targets appear to move, rather than appearing stationary. In that case components are added to simulate the course, speed and rate of climb or dive of each of the targets, the techniques for such additional controls being well known in the art. However, as the use of such added controls is not pertinent to the present invention, they are omitted, and only the three-dimensional positioning of each target is accomplished in the target generator here employed. The radar simulator also generates a signal representative of the scanning movement of a V-beam radar antenna or space radiator, in order to simulate the transitory illumination characteristic of the viewing screen of an actual radar instrument.

In the instrument of this invention the viewing screen is identical with that of the simulated V-beam radar device and consists of a rectangular field having abscissae representing slant range of the targets and ordinates representative of altitude. Manual selection of the azimuth sector containing the target places the target pip on the viewing screen, and a family of height curves on an overlay placed over the screen then enables the height of the target to be read.

The general method by which radar operation is simulated includes the production of alternating current signals, which, by their voltage magnitudes and phases relative to a standard, represent the azimuth and range of a target and the bearing of a vertical antenna beam as it would be represented by the echo return. Another signal is generated which represents by its relative phase the slant-beam antenna signal of the radar set. These antenna signals have a relative phase that changes very slowly at a rate representing the azimuth movement of a radar scanning antenna. When phase coincidence occurs between the vertical antenna beam azimuth and the target azimuth, a signal is generated representing the radar echo. This signal is made to produce a transitory illuminated mark on the screen. A similar illuminated mark a fraction of a second later is made to appear on the screen to represent the return from the slant beam. By means of the height curves the distance between the illuminated marks is made to represent the target height, while the abscissa represents the slant range, and as stated the manual adjustment of the vertical mark to a base line produces an azimuth indication.

The general object then of this invention is to simulate the operation of a V-beam radar instrument, employing a plurality of preset simulated target signals, these signals representing the position in space including its height, and employing a display representing the positions of the simualted targets in space including their heights.

A further understanding of this invention may be secured from the following detailed description and associated drawings, in which.

Figures 1, 2, 7, 8, 9:
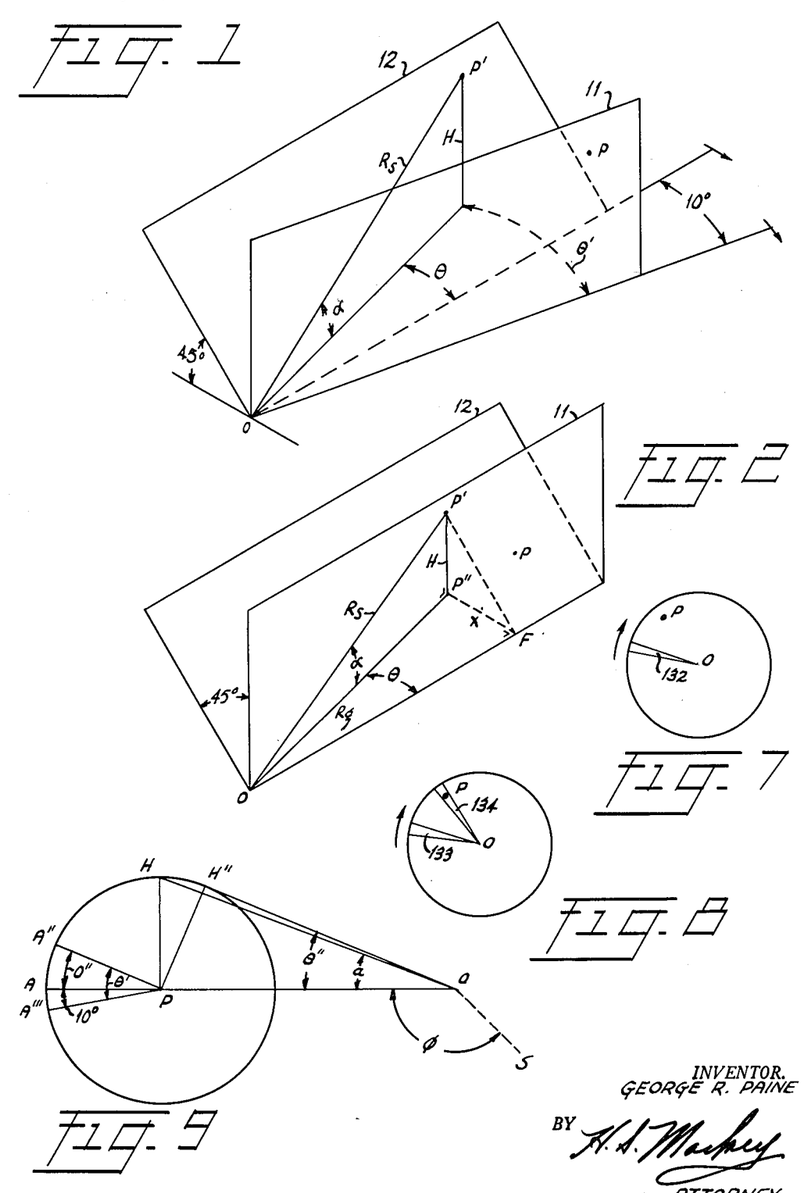
Figures 1 and 2 illustrate the spacial distribution of the two beams of a V-beam radar transmitter.
Figures 7, 8 and 9 show phase relations of voltages within the simulator.

In order to facilitate an understanding of the radar simulator, it is desirable to describe briefly the operation of the V-beam radar instrument whose functions are to be simulated. This type of radar instrument scans the space surrounding it in order to detect and measure the positions of all aircraft within that space. In order to detect and measure a target aircraft, this radar instrument continuously emits two antenna beams as illustrated in Fig. 1. One beam, 11 is positioned vertically with an azimuth thickness of only 10, a range of 100 miles and a maximum elevation of about 30°. Although this beam is here shown for simplicity and clarity as a flat, vertical rectangular sheet, it actually has a characteristic lobar shape.

The second beam 12 is positioned in a plane slanted or displaced from the vertical by 45°, with its bottom edge in the same horizontal plane as that of the vertical beam but displaced horizontally by an angle of 10°. Both beams rotate clockwise in azimuth about the position O of the radar instrument. A target such as an aircraft P is then illuminated first by the vertical beam, returning an echo to the radar instrument, and a short time later as the antenna rotates, the same target is illuminated by the slant beam at P'. By measurement of the radar echo return time to secure slant range $R_s$, represented by the length OP', and by measurement of the azimuth angle $\theta'$ between the two signals, both the elevation angle $\alpha$ and altitude H may be computed.

Fig. 2 is similar to Fig. 1 with the omission of the 10° separation between the antennas for convenience in computations. In the triangle OP'P'', $$\tan \alpha = \frac{H}{R_s} \tag{1}$$

also in the triangle OP''F, $$\sin \theta = \frac{X}{R_s} \tag{2}$$

But since the slant beam is at an angle of 45°, $X=H$ and $$\tan \alpha = \sin \theta \quad (3)$$

In the radar instrument this equation is employed to compute the elevation angle $\alpha$ when the azimuth angle has been measured.

The azimuth angle $\theta$ is secured by subtracting 10° from the measured angle $\theta'$. The altitude H is computed by solving the right triangle in which the elevation angle and slant range are known, that is, $$H = R_s \sin \alpha \quad (4)$$

Computations are partly carried out within the instrument and partly by manual manipulation of the display device. This device includes a cathode ray tube having a grid inscribed on its screen with slant range and azimuth difference angle as coordinates. A family of height curves is inscribed on a transparent overlay, and after proper manual adjustment of the vertical position of the pips and of the overlay, the target height is directly indicated by the position of a pip on the family of curves.

In the simulation of the operation of such a V-beam radar instrument it is necessary to generate target signals for each simulated target, and the number of targets is only limited by the number of separate target signal generators provided. In describing the simulator's operation hereinafter, only one set of target signals is referred to since the simualtor's operation on one signal is representative of its operation on any number of simultaneous signals.

The input data to the simulator of the instant invention are different from those of an actual radar instrument, and consists of target position in the ground plane in the form of rectangular coordinates, and target height, all set into the simulator by means of its target signal generator. The simulator's function is to generate from these data such electrical signals representing slant range, target azimuth and azimuth difference angle as are required to energize a cathode ray tube display identical with that regularly used with an actual radar instrument.

The method employed is to compute slant range and target azimuth and deliver them to the display. In addition, an azimuth difference angle $\theta''$ is computed having a value representative of the desired elevation angle $\alpha$. A close approximation to the 10° beam separation is added, the error resulting from this approximation being negligible, and the sum $\theta'$ is delivered to the display, wherein the height is computed by manual manipulation of the illuminated marks as in an actual radar instrument.

Figure 3:
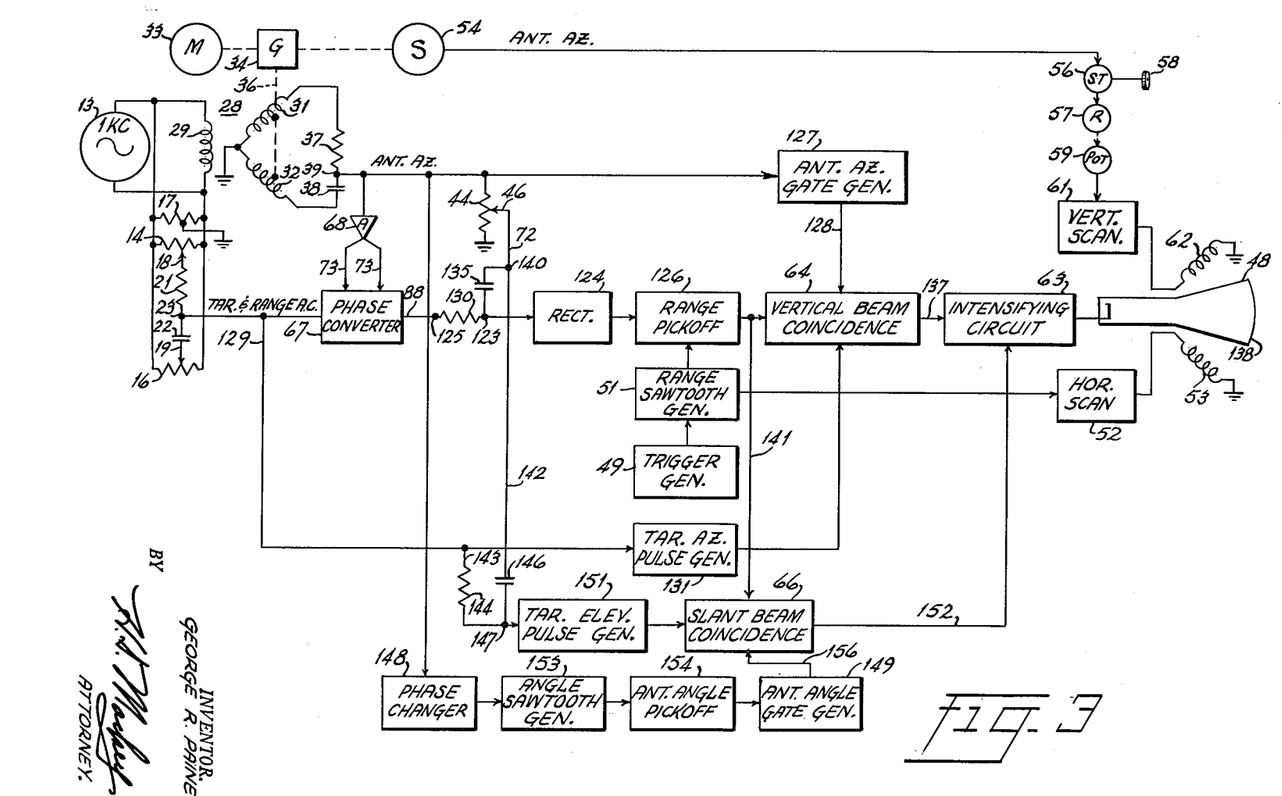
Figure 3 is a block schematic diagram of the simulator.

The instrumentation of the simulator is generally depicted in the block diagram of Fig. 3. A generator 13 produces a sinusoidal alternating current voltage having a frequency of, say, 1000 cycles per second. The output of this 1 kc. generator is employed throughout the simulator both as the signal energy source and also as the standard of voltage, frequency and phase.

A target signal generator consists in part of two voltage dividers 14 and 16 energized by the generator 13, the dividers having midpoints effectively grounded by means of center-tapped resistor 17. The magnitude and sense, relative to ground of the output voltage at slider 18 of the divider 14 represents the instantaneous north-south rectangular coordinate position of a single target projected on the ground plane, and the voltage output at slider 19 of voltage divider 16 similarly represents the position of the target in the east-west direction. Each of these voltages has of course, the same frequency as the source and their relative phases are either the same or opposed depending upon whether the sliders are positioned upon the same sides of their center points or on opposite sides. A resistor 21 and capacitor 22 are connected in series between the sliders 18 and 19, and an output voltage is taken between the common junction 23 and ground. The magnitude of resistance 21 is made equal to the reactance of capacitance 22 at the generator frequency. The magnitude and phase of the output voltage at junction 23 then are polar representations of the slider positions. That is, if the positions of the sliders 18 and 19 be defined as representing in rectangular coordinates the position of a point in a plane, the output voltages and phases at these sliders are the electrical analogues of these coordinates, and the output voltage magnitude and phase angle between the common junction 23 and ground are the electrical analogues of the polar coordinates of the same point in the plane. The polar voltage magnitude is referred to the generator voltage as standard and the polar phase angle is referred to the generator output phase as standard. In terms of target position in the ground plane, the polar voltage magnitude is proportional to the target ground range and the phase is proportional to the azimuth direction of the target referred to some standard direction, such as north.

This circuit for coordinate analogue generation and for coordinate system transformation is more fully described in the application of E. B. Hales, Serial No. 3,652 filed January 31, 1948, now Patent No. 2,610,789 issued September 16, 1952.

Figure 4:
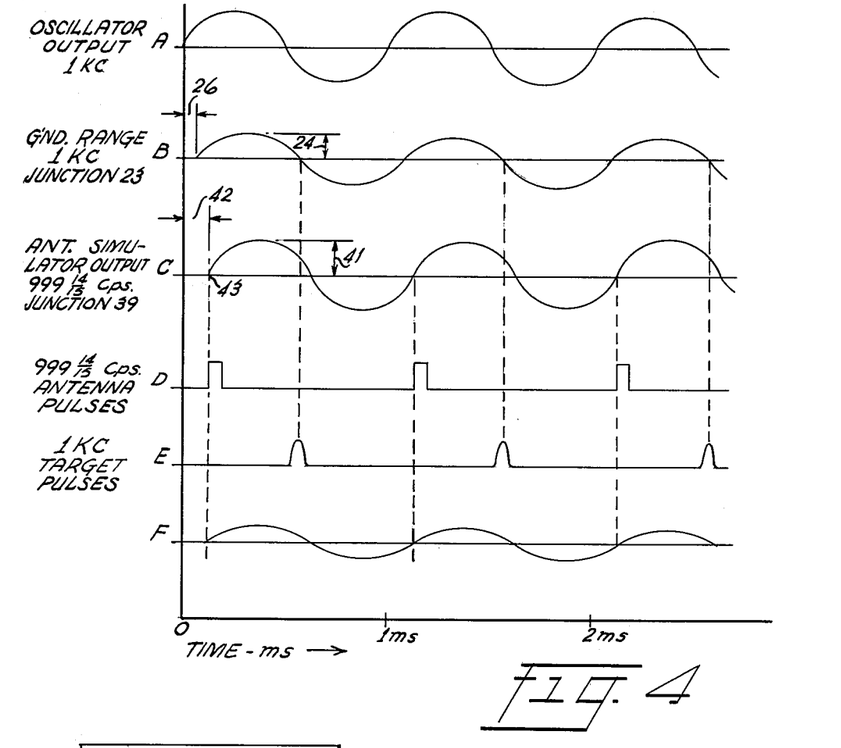
Figure 4 depicts graphs illustrating the operation of the simulator.

The magnitude and phase of the output voltage at junction 23 are shown in graph B, Fig. 4, referred to the voltage and phase of the generator 13 output, which is shown in graph A for comparison. The peak voltage 24 of graph B represents target range and the phase as measured by the angular lag 26 behind the phase of the reference voltage represents target azimuth. These electrical quantities 24 and 26 are constant at any setting of the sliders 18 and 19, and change only when either or both of the slider settings are changed.

A plurality of such analogue voltages may be combined by well known methods simultaneously to represent on the indicator a number of targets. Each added target requires the duplication of the components illustrated in Fig. 3 up to but not inclusive of the cathode ray tube input circuits. However, no present advantage is secured by showing and describing a multiplicity of target generators, and for clarity the description is therefore confined to operation considering only a single simulated target.

A synchro 28 consists of a stator or primary winding 29 energized by generator 13 and two secondary windings 31 and 32 positioned at a right angle on a rotor. The rotor may be rotated in any regular or irregular manner to represent the azimuth scanning motion of any type of radar antenna, but for the present purposes, will be considered to have a constant rotation of four revolutions per minute. Rotation is effected by an electric motor 33 driving the rotor through step-down gears 34 and shaft 36. A resistor 37 and capacitor 38 having equal reactance at the input frequency are connected across the free terminals of windings 31 and 32 and the output is taken between the common terminal 39 and ground. This output has a constant voltage for all positions of the rotor and a phase relative to the generator phase which is directly proportional at all times to the angular position of the rotor shaft 36.

This output is represented at C in Fig. 4. The output voltage magnitude 41 is a constant, depending only on the generator voltage and is not used in the computations made by the instrument. The output voltage phase 42 referred to the standard of phase constantly changes at the rate of $\frac{1}{15}$ cycle per second, advancing or receding relative to the standard in accordance with the direction of rotation of the rotor. In this case a phase retardation is preferred for illustration, and the phase angle 42 constantly increases as the axis-crossing point 43 and the entire curve can be imagined as continuously drifting bodily to the right in the figure, while the reference curve A is stationary.

It is useful to realize that the output of the phase splitter at terminal 39, Fig. 3, may be regarded as having a sum or difference frequency which is, in this example, the difference of the 1 kc. input electrical energy frequency and the 1/15 cycle per second mechanical input frequency of shaft 36, the difference of 999 14/15 cycles per second being the precise electrical output frequency.

The synchro circuit constitutes an antenna simulator and the output thereof at junction 39 is an electrical analogue of the azimuth rotation of a radar antenna. The varying output phase represents by its instantaneous value relative to the reference phase of the generator 13 an antenna position in terms of the instantaneous value of the azimuth angle of the antenna beam. In the present instance in which a V-beam radar instrument is simulated which has two beams, the azimuth direction of the vertical beam is simulated by the phase of the antenna analogue voltage.

The output of the antenna simulator is employed to excite a voltage divider 44, the output voltage of which, derived from manually settable slider 46, has a magnitude which represents the height above the earth of the target. This output voltage is of course proportional to slider position. While the output phase is the same as the phase at junction 39 and is represented at all times by the changing phase of graph C, Fig. 4, it is not employed in the representation of target heights.

In representing a member of targets at the same time, all components contributing to the production and use of target altitude up to the cathode ray tube circuits can be duplicated for each target, all targets then being capable of indication on the same display tube.

The components so far described constitute the antenna simulator and one target generator, the latter being manually adjustable for any desired target east-west or X coordinate, any north-south or Y coordinate, and any height. Any change in target position is made by a manual change in settings. Of course, in place of such a target generator a more complex generator may be employed, including means for setting rates of continuous changes in target coordinates, or means for setting target course and speed.

Figure 5:
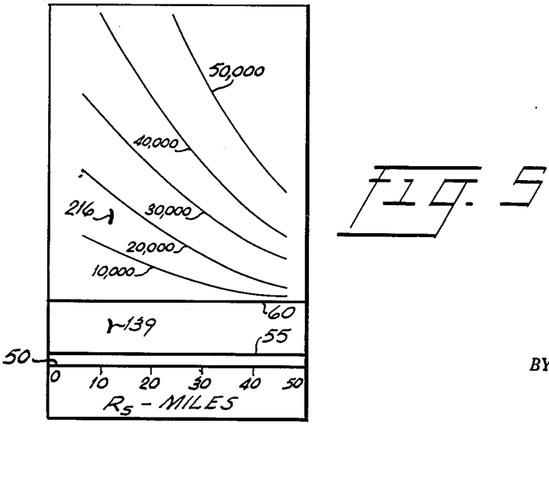
Figure 5 represents a view of the screen for display of the simulator output.

The display component comprises a cathode ray tube 48, Fig. 3, having a display face 138. Its appearance when in operation is shown in Fig. 5. The display face comprises the fluorescent screen of the cathode ray tube upon which there may be inscribed an abscissa scale 50 representing slant range (Rs) in miles. The display face also includes a transparent overlay that is slidable vertically over the cathode ray tube screen. This overlay carries two horizontal lines, 55 and 60, and a family of curved lines marked in altitude in feet.

The cathode ray tube 48 is provided with conventional scan circuits. A trigger circuit 49 generates 600 trigger pulses per second to trigger a sawtooth generating circuit 51. The sawtooth output voltage through a horizontal scan circuit 52 energizes a horizontal magnetic scan coil 53 to scan the cathode ray beam in the horizontal direction, thus generating horizontal raster lines.

The antenna simulator driving motor 33 is mechanically connected to a synchro transmitter 54 which is connected through a synchro transformer 56 to a synchro receiver 57. A knob 58 permits manual change of phase at the receiver 57 by mechanical rotation of the rotor of the transformer 56. The receiver 57 is mechanically connected to a voltage divider 59 arranged for continuous rotation, through which a continuously increasing sawtooth voltage is applied by a vertical scan circuit 61 to a vertical magnetic scan coil 62, thus providing sawtooth generation of the vertical raster lines. An intensifying circuit 63 is connected to a control electrode of the cathode ray tube which may be, for example, its cathode.

The intensifying circuit is actuated by successive pulses of electrical voltage in such a way as to produce two marks on the display for each target "seen," from which marks the slant range and height of the synthetic target may be read. The successive pulses are applied to the intensifying circuit from two coincidence circuits 64 and 66, thhe former generating a train of pulses representing the vertical beam antenna azimuth position and the latter generating a second train of pulses representing the slant beam antenna azimuth position. Each coincidence circuit is in turn energized by several input signals.

One of these input signals, representing slant range, is applied to both coincidence circuits. In general this signal is generated by the quadrature addition of voltages representing ground range and height in a resistance-capacitance circuit operating similarly to the phase-splitting circuit described above. The voltage representing ground range is derived from the junction 23 and a voltage representing height is derived from the slider 46. However, the voltage at junction 23 does not necessarily have the same phase as the voltage at slider 46 and it therefore, becomes necessary to transform the phase of one of these voltages so that it equals at all times the phase of the other without changing the magnitude before they can be added. It is preferred to transform the phase of the voltage at junction 23 to equal that at slider 46, which is accomplished by the phase converter 67.

Figure 6:
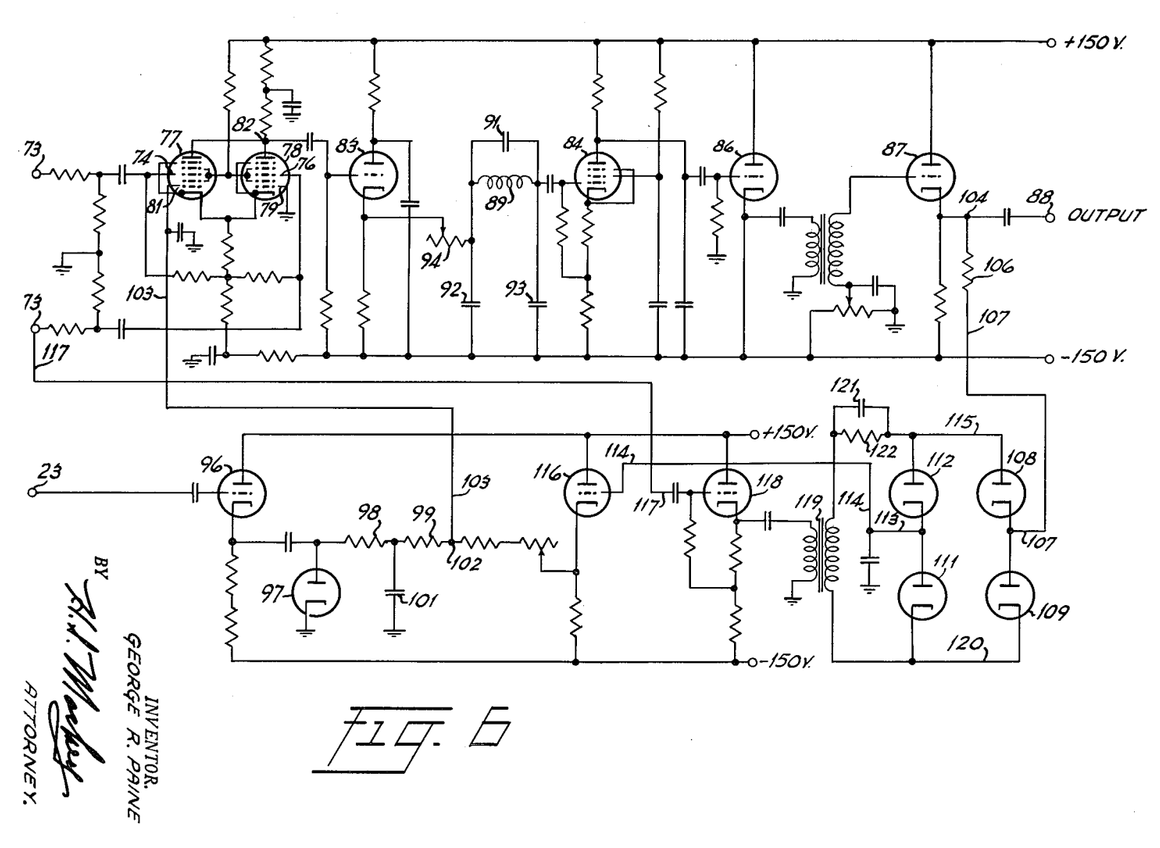
Figure 6 is a schematic diagram of the phase changer.

The circuit of the phase converter 67 is schematically illustrated in Fig. 6. A push-pull phasing input is secured through amplifier 68, Fig. 3, and is applied to terminals 73—73, Fig. 6, while the voltage representing ground range is secured from junction 23, Figs. 3 and 6.

The phasing signal is applied from the terminals 73—73 to the third grids 74 and 76 of a balanced modulator employing two pentagrid tubes 77 and 78. The first grid 79 of tube 78 is grounded and a modulating or control direct-current voltage is applied to the first grid 81 of the other tube 77. This control voltage ranges between zero and —2 volts, and represents the magnitude of the target ground range voltage. The output at plate terminal 82 is an alternating voltage whose phase is representative of the antenna simulator phase and whose magnitude is representative of the target ground range.

This output is amplified in the alternating-current amplifier including tubes 83, 84, 86 and 87 to become the phase converter output at terminal 88. This output is sinusoidal, having the phase of the antenna simulator and a magnitude between zero and 60 R. M. S. volts representative of target ground range.

The amplifier contains a modified M-derived filter, including inductor 89 and capacitances 91, 92 and 93, to eliminate any second harmonic from the 1 kc. signal. In order to reduce the phase shift of such a filter and also to provide a means for precise phase adjustment so that the phase to ground at output 88 will be exactly that of one side of the inputs at 73—73, an adjustable resistor 94 is provided at the filter input and the filter output is arranged to feed into the very high grid input impedance of tube 84.

The target ground range alternating voltage at terminal 23, Figs. 3 and 6, serves as the ground range phase converter input and is applied in Fig. 6 to a cathode follower 96, the output of which is rectified by diode 97 and filtered by resistors 98 and 99 and condenser 101 to contribute to a direct-current negative potential at junction 102. This potential representative of range is applied through conductor 103 to grid 81 of the balanced modulator tube 77.

A large degenerative feedback is employed to secure linearity of amplifier output. This feedback path extends from output junction 104, through resistor 106, conductor 107, a phase-sensitive detector comprising diodes 108, 109, 111 and 112, conductor 113, conductor 114, and cathode follower 116 to the junction 102. At the junction 102 the degenerative feedback potential is positive and opposes the negative potential derived from input terminal 23 by such an amount as to leave a difference potential which varies from zero to —2 volts depending on the alternating voltage magnitude at input terminal 23. This difference potential is applied to grid 81 as before mentioned.

In order to prevent the possibility of noise peaks momentarily making grid 81 positive, which would cause the amplifier to become regenerative and inoperative, the phase-sensitive detector including tubes 108, 109, 111 and 112 is furnished with reference phase potential from input terminal 73 through conductor 117. By means of a circuit consisting of the cathode follower 118 and the transformer 119 this 1 kc. phasing energy charges condenser 121, which can discharge only very slowly through the resistor 122, so that the conductors 115 and 120 assume, for nearly all of each cycle, voltages of opposite phase representing the transformer secondary terminal voltages. During a small fraction of each cycle all four tubes 108, 109, 111 and 112 are conductive and in the absence of other input the voltages of all electrodes are substantially equal. At that time the voltage of all electrodes relative to ground is controlled by the direct-current voltage applied through conductor 107 as modified by that instantaneous magnitude of the alternating current signal also carried thereby at that instant of time. If, however, malfunction occurs such as would tend to drive the grid 81 positive, the phase at conductor 107 reverses and the voltage magnitude increases, the polarity of connection being such that the feedback voltage is immediately reduced toward zero. In the absence of input at 23 this feedback voltage reaches zero and in any event reaches a level that restores the amplifier to normal functioning.

The output of the phase converter circuit at terminal 88 has, as before stated, the antenna phase and the ground range voltage magnitude. This output is applied to one terminal 125, Fig. 3, of a resistor 130 which together with a series condenser 135 forms a phase splitting circuit. The other terminal 140 of the condenser 135 is connected to the height voltage slider 46, so that the voltage between ground and the common junction 123 of the phase splitter represents the quadrature sum of the applied voltages, and therefore is the voltage analogue of slant range, i. e., the vector sum of ground range and height. This voltage has a frequency of 1 kc. and has the changing phase of the antenna simulator output and is rectified by the rectifier 124 to a proportional direct voltage. This direct voltage is employed in a conventional range pickoff circuit 126 together with the sawtooth voltage output obtained from generator 51 to produce a pulse at a time in the sawtooth cycle representative of target slant range. For example, the range pickoff circuit 126 may be of the type disclosed and claimed in the patent to Gilbert, No. 2,555,440 dated June 5, 1951.

This pulse is employed to intensify the cathode ray once in each successive horizontal scan, as permitted by a control gate, to form a display mark on the screen of the cathode ray tube 48 at a distance from the left margin representative of slant range. This is substantially similar to the conventional radar technique for effecting a similar result. However, the passage of these pulses from the circuit 126 to the intensifying circuit 63 is under control of the vertical coincidence circuit 64, and the pulses are prevented from passing through the intensifying circuit at all times except during phase coincidence between two other signals. This coincidence action represents the requirement in the actual radar instrument for azimuth coincidence between the rotating vertical radar beam and the moving target in order to permit the display representing the latter to become illuminated.

One gating input to the vertical coincidence circuit 64 is secured from the junction 39 of the antenna simulator and has the form and phase represented in graph C of Fig. 4. From this sinusoidal wave form a pulse is generated in a gate circuit 127 each time that the wave form crosses the zero axis in the positive-going direction, and the pulse is caused to generate a rectangular gate pulse of about 2 $\mu$s in width. This pulse occurring 1000 times per second, is initiated at times which represent the changing antenna phase, and is applied through conductors 128 to the vertical coincidence circuit 64. This series of gate pulses is indicated in graph D, Fig. 4, which bear the prescribed time relation to graph C.

A 1 kc. voltage proportional to ground range and having a phase relative to that of the output of generator 13 representing target azimuth is applied from junction 23 through conductors 129 to the target azimuth pulse generator 131. This sinusoidal voltage is converted to rectangular voltage wave form, as indicated in E, Fig. 4. This pulse having an effective width of about 1 $\mu$s. is applied to the vertical coincidence circuit 64.

Time relations can be visualized in Fig. 4 by realizing that the 1 kc. target pulses E are stationary, but have a phase differing from that of A by an amount representing target azimuth. The 1 kc. rectangular antenna pulses D have a constant drift toward the right and, when they are in vertical alignment with the pulses E, coincidence exists. Since the pulses D are 2 $\mu$s. wide and the pulses E are 1 $\mu$s. wide, coincidence exists for a time representing 3 $\mu$s., which in terms of the radar antenna represents a vertical beam width of ⅔° and a target width of ⅓°. The effect corresponds to the effect of a 1° radar beam scanning a target of infinitesimal width.

These time relations of the simulated radar instrument are indicated in Fig. 7, in which the sector 132 represents a ground plane projection of the vertical antenna beam of a simulated radar instrument revolving in the clockwise direction about the radar position O, at the rate of four revolutions per minute. The angular width of the antenna beam is ⅔°. A stationary target is indicated by the dot P having an angular width subtending ⅓° at the radar position O and having an azimuth direction therefrom that depends upon the target generator E-W and N-S voltage divider settings. As the beam 132 sweeps past the target P coincidence between some portion of the beam and target will occur for a time of 1/360 revolution of the beam.

The diagram of Fig. 8, although superficially similar to Fig. 7, is quite different in meaning. Its circumference represents a time scale, the circumferential distance representing 1/1000 second. Radial distance represents the magnitude of an electrical pulse. The sector 133 represents antenna pulses, so that it is quite similar in meaning to graph D, Fig. 4, the time scale being circular in Fig. 8 and linear in Fig. 4. As the antenna rotates, the sector 133 representing the gated antenna pulse slowly migrates in a clockwise direction, the pulses meanwhile occurring at the rate of 1000 per second. The sector 134 marked by the dot P represents the target pulses, also occurring at the rate of 1000 per second but not migrating except as the target moves in azimuth. This sector gives all of the information of graph E, Fig. 4.

The sector 133 is nearly stationary, and the relatively slow drift of the phase of the pulses of curve D toward the right is represented by a drift of the sector 133 in a clockwise direction at the rate of 1/15 C. P. S. Since the sector 133 drifts clockwise at the rate of 1/15 revolution per second, and the sector 134 does not drift, once in every 15 seconds coincidence occurs between the two sectors and persists for a time during each 1/1000 second revolution representing a maximum of 3 $\mu$s. on the 1 kc. phase scale and for an angular drift distance of 1° on the antenna circle.

During coincidence the path through the vertical coincidence circuit 64, Fig. 3, between the range pickoff circuit 126 and the intensifying circuit 63 is made conductive, and the horizontal sawtooth intensifying pulses pass through the vertical coincidence circuit 64 and the conductors 137 to circuit 63.

These pulses, as represented through the action of the intensifying circuit 63 by points of light on the screen 138 of the cathode ray tube 48, are seen in their aggregate effect as a single vertically elongated spot of light, such as 139 in Fig. 5. In this display each sawtooth horizontal scan or raster line may be visualized as occurring slightly higher than the last preceding one, so that the fast sawtooth produces horizontal raster lines from left to right and the slow scan is from bottom to top, with a horizontal scale of zero to 50 miles and a repetition rate of 600 scans per second, and a vertical scan of zero to 360°, and a rate of 1/15 cycle or 24° per second. The vertical scale is so expanded and enlarged that only a 45° sector may be seen on the screen at one time, although azimuth degrees are not marked thereon. Consequently the manual adjustment 58 heretofore mentioned is provided to permit selection of the desired 45° azimuth sector, the adjustment knob 58 being calibrated in azimuth degrees.

In operation, considering only the vertical antenna beam illuminated mark 139 as described, the knob 58 is turned in accordance with target azimuth information furnished from other sources, or if no target azimuth information is furnished the knob may be turned until a mark appears on the screen. In either case the mark may appear anywhere vertically on the screen, the horizontal scale point representing the target slant range. The knob 58 is then turned until the mark, indicated in Fig. 5 at 139, lies between the lines 55 and 60 of the overlay. The overlay is then moved until the line 55 coincides with the mark 139. The length of this mark is one degree of the vertical scale. Its behavior simulates that of a radar display, being illuminated for one degree of each 15-second antenna revolution, or for about 42 milliseconds. After an interval of about 14,958 milliseconds it is again illuminated. During the 42-millisecond illumination period it is not continuously illuminated, but is illuminated 25 times as it is scanned at the 600 C. P. S. rate by the horizontally scanned beam. The tube phosphor persistence of course, prevents visible flicker during each 42-millisecond illumination.

As was stated, the coincidence circuit 66 also receives the slant range pulses from the range pickoff circuit 126. These pulses are transmitted through conductors 141 and, as in the case of the vertical coincidence circuit 64, these pulses are permitted to pass on to the intensifying circuit 63 only when two other pulses are in mutual coincidence. The circuit 66 simulates the action of the slant beam radar antenna and the two sets of pulses required to be in coincidence represent by their phases, the target azimuth position and the slant antenna azimuth position.

One of these pulses may be termed the target elevation angle pulse, and is formed as follows:

In Fig. 3 an alternating voltage representing by its magnitude target ground range is secured from the junction 23 of the target generator. Its frequency is that of the 1 kc. generator 13 and its phase is that of the generator plus a phase angle representing target azimuth and is constant for any particular setting of the target generator, as shown in graph B, Fig. 4. A second alternating voltage representing target height is secured from the slider 46 of the height voltage divider 44. Its frequency is approximately that of 1 kc. generator and its phase is that of the antenna simulator and therefore is continuously changing. Its graph F is therefore like that of C in phase but in addition represents target height by its voltage magnitude.

These two voltages are applied through conductors 142 and 143 to a phase splitting circuit comprising resistor 144 and condenser 146, with an output derived between the junction 147 and ground. The phase relationships are shown in Fig. 9. The line OP represents by its length the target ground range and represents target azimuth direction by its constant phase angle $\phi$, in a time circle centered at O relative to the 1 kc. generator output phase direction OS. A rotating line PA represents by its length the target height and by its phase relative to direction OS the continually changing antenna azimuth. The phase change is in such direction that the line PA may be visualized as rotating clockwise in a time circle about P, the line OP remaining stationary. This diagram is to this point similar to that of Fig. 8, the line OP representing the center line of sector 134, the line PA representing the center line of sector 133, and angular coincidence of the sectors of Fig. 8 being similar in Fig. 9 to the linear position of coincidence of PA and OP, in which position their phases are the same or in coincidence.

The line PH is erected at 90° to the line PA and is made of the same length, representing the voltage magnitude at the slider 46. Its phase is representative of the antenna phase and varies with it, with a constant angular difference of 90° due to the phase shift of condenser 146 and resistor 144. Since PH represents by its length the target height, when it is at right angles to the ground range line OP the hypotenuse OH represents slant range by its length and the angle POH equals the target elevation angle $\alpha$.

Let the antenna phase represented by line PA rotate through $\theta''$ to the position PA'' parallel to the tangent OH''. The angle POH'' then is also $\theta''$. In the triangle POH, $$\tan \alpha = \frac{PH}{OP}$$

and in the triangle POH'', $$\sin \theta'' = \frac{PH''}{OP}$$

But since PH=PH'', tan $\alpha$=sin $\theta''$. Therefore $\theta''$ is the angle at coincidence indicated as $\theta$ in Figs. 1 and 2, through which the antenna must rotate in order that the angle $\alpha$ shall be the true elevation angle. This diagram thus illustrates a method for computing $\theta''$ when $\alpha$ is known.

In order to understand how this elevation angle is determined by the instrumentation, it is to be kept in mind that the phase of the voltage at the junction 147 relative to the phase of the voltage representing target azimuth is represented in Fig. 9 by the angle POH which changes as the point H, in quadrature with the antenna phase voltage, moves around its antenna phase circle from a maximum positive to a negative maximum and back again. At only one position, however, is this phase the same as the antenna phase itself, which is at the value $\theta''$. If then, coincidence is indicated by means of a coincidence circuit between the phase of the antenna and that of junction 147, the spatial trigonometrical solution of Fig. 2 will be solved.

This is not, however, the ultimate desired solution because of the 10° lag of the slant antenna behind the vertical antenna in the simulated radar instrument. Therefore, instead of employing the antenna azimuth gate output of the generator 127 previously employed as an input to the vertical coincidence circuit 64, it is necessary to generate another azimuth gate output having a lag of 10° behind that of the former gate. This is accomplished in a phase change circuit 148 which also includes sufficient phase advance to compensate for the phase lag produced by the phase-splitting circuit 144—146. The phase change circuit 148 is followed by a 2$\mu$s. gate generator 149 and the gate signal is applied to the slant coincidence circuit 66. In Fig. 9 this 10° retarded gate is indicated by the line PA''', 10° behind PA, so that $\theta'=\theta''+10°$, $\theta'$ being the same at coincidence as $\theta'$ in Fig. 1. When therefore a pulse is generated in the target elevation pulse generator 151 representing the electrical phase at junction 147 and is applied to the slant coincidence circuit 66, phase coincidence with the gate from 149 occurs at a time representative of target elevation and a path is completed through circuit 66 for the range sawtooth pulses. These pulses pass from circuit 126 through conductors 141 to circuit 66 and through conductors 152 to the intensifying circuit 63.

Figure 10:
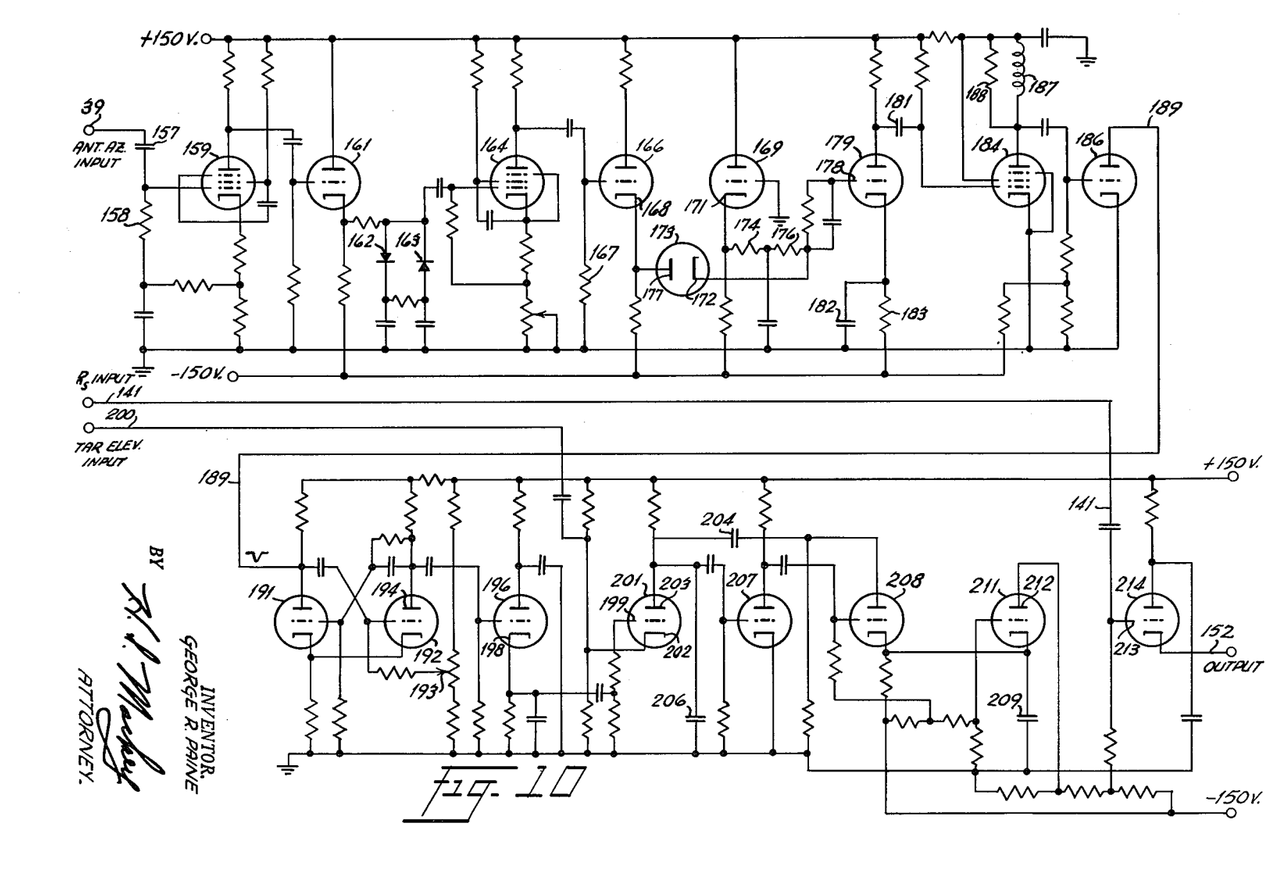
Figure 10 is a schematic diagram of the simulated slant antenna signal generator.

The phase changer 148, Fig. 3, and the angle sawtooth generator 153, slant antenna angle pickoff 154, antenna angle gate generator 149, and slant beam coincidence circuit 66 are shown schematically in Fig. 10. This group of subcircuits generates a substantially straight sawtooth voltage wave form from a sinusoidal wave form and from the sawtooth form generates a pulse accurately representative of a selected voltage level and therefore, representative of a specific phase. The potential representative of this phase is then applied at 156 to the slant coincidence circuit 66.

One input for these subcircuits is derived from the antenna simulator junction 39, Figs. 3 and 10 and is applied to a phase advance circuit consisting of condenser 157, and resistor 158 in series (see Fig. 10). The output is amplified in tubes 159 and 161 and limited by the rectifiers 162 and 163 to a trapezoidal wave form symmetrical about the alternating current axis. This signal is inverted and amplified in tubes 164 and 166, the control grid of the latter being grounded through a ½ megohm resistor 167 to set the trapezoidal axis of the signal taken from the cathode 168 at the ground level.

The control grid of tube 169 is grounded, placing its cathode 171 also substantially at ground, and the cathode 172 of tube 173 being connected thereto through resistors 174 and 176 is also at ground potential. As the trapezoidal signal impressed on the plate 177 of tube 173 from cathode 168 rises from its minimum value, tube 173 becomes conductive when the input signal reaches ground potential, and the remaining part of the sharply up-going portion of the trapezoidal wave form is impressed on the control grid 178 of tube 179, producing a correspondingly rapid fall of potential at the plate which is transmitted through condenser 181 as a sharp negative pulse. The high-frequency components of this transient pulse are emphasized by the condenser 182 and resistor 183, which also minimize the low-frequency components. The output is amplified in tubes 184 and 186, the plate inductance 187 being designed to resonate with its distributed capacitance at the transient high frequency, but so damped by resistor 188 that little after the first half cycle is transmitted.

The tube 186, through conductor 189, triggers a monostable multivibrator comprising tubes 191 and 192, the tube 192 being normally conductive. The unstable state in which tube 191 conducts is adjustable between 1.7 and 4 µs. by means of voltage divider 193 and the positive output gate pulse appearing at the plate 194 is fed through cathode follower 196 to reduce the output impedance.

The positive gate output at the cathode 198 is applied to the control grid 199 of tube 201. An input in the form of rectangular negative pulses received at terminal 200 from the target elevation pulse generator 151, Fig. 3, is applied to the cathode 202. Tube 201 is normally nonconducting and conducts only when both pulses are simultaneously applied to its grid and cathode, which occurs only when they are in phase. The negative gate then produced at plate 203 is stretched by condensers 204 and 206, and renders the following tube 207 nonconductive. This renders the normally cutoff tube 208 conductive long enough to discharge condenser 209, so that tube 211 becomes nonconducting and the potential at its plate 212 rises. The recharge path of condenser 209 is slow enough so that when 1 kc. pulses are received, tube 211 is kept continuously nonconducting, but upon the omission of pulses for a time of about 1½ pulse periods, tube 211 again conducts. The plate 212 is conductively connected to the grid 213 of the tube 214, which is normally biased to −80 volts, but when tube 211 conducts the bias is raised to −40 volts.

The slant range target positive pulses are applied through conductor 141, Figs. 3 and 10, to the grid 213. These pulses are insufficient of themselves to cause the tube 214 to conduct when its bias is −80 volts, but at −40 volts bias, the tube 214 is made conductive and the pulses pass through the tube 214 to the cathode and conductor 152, from which they are applied to the intensifying circuit 63, Fig. 3.

The operation of the slant antenna coincidence circuit 66, Fig. 3, in coordination with the remainder of the simulator is as follows: The range pulses applied through conductor 152 to the intensifying circuit 63 form an intensified mark 216, Fig. 5 which is, of course, at the same range on the horizontal scale as the vertical antenna mark 139. Mark 216 is, however, later in azimuth and therefore higher on the screen by angle $\theta'$ as was explained in connection with Fig. 9. When the mark 139 has been manually placed at the zero azimuth line the azimuth scale reading of mark 216 on the screen represents the angle $\theta'$, while the azimuth scale reading on the manual knob 58 represents the target azimuth. Indication of the mark 216 on the curved family of height curves marked 10,000 to 50,000 gives the target height in feet.

To summarize briefly, alternating current energy is derived from a standard source and converted to two potentials the magnitudes of which are representative of X and Y target coordinate positions. These magnitudes are added in vector quadrature and a single voltage produced from such sum whose magnitude is representative of the quadrature vector sum and whose phase angle is representative of the phase angle of such vector sum, that is, two potentials representative of rectangular coordinates of target position are converted to a single voltage representative of polar coordinates of the same position, the magnitude representing ground range and the phase, target azimuth.

A potential is also derived from the main source and converted to a potential whose phase constantly varies in representation of simulated antenna azimuth or scanning position. A fraction of the magnitude of this latter potential is selected as representative of target height and this latter potential is vectorially added in quadrature to the potential representative of ground range after the phase of the latter has been converted to the phase of the target height potential. This vector sum potential is then representative in magnitude of the target slant range. The slant range potential acts to intensify a cathode ray tube beam at a time in the horizontal sweep which is representative of the magnitude of that potential so that horizontal displacement is a measure of slant range. At the same time through action of a coincident circuit this intensification takes place at a selected time in the vertical scan. This vertical timing is accomplished by impressing two gate potentials on a coincidence circuit, the time of occurrence of the first depending on the phase of the antenna azimuth potential and time of occurrence of the second on the phase of the target azimuth potential. Only during the time of concurrence of these gates is the cathode ray beam intensified and the time of initiation of the vertical scan is adjusted until the intensified mark coincides with a horizontally extending fiducial mark on the screen.

In order to obtain target height or altitude a second cathode ray intensified mark is generated which incorporates this information by reason of its position on the cathode ray screen in the same manner as the same information is depicted on the screen of a V-beam radar instrument.

This second intensified mark is likewise derived through a coincidence circuit which permits passage of electrical impulses only at such times as two separate gate pulses are coincident in time. A potential having a magnitude equivalent to target height and a phase equivalent to antenna azimuth is vectorially added to the potential equivalent to ground range producing a potential whose phase varies between selected limits, and a first gate potential is derived therefrom the time of occurrence of which depends on the phase of the vectoral sum potential. A second potential whose phase depends on the antenna azimuth is changed in phase by a suitable amount and the resultant potential acts to generate a second gate, the time of occurrence of which bears a definite relation to the antenna azimuth or phase. Both of these gating potentials are simultaneously applied to a coincidence circuit which also has a potential applied thereto, the time of occurrence in the horizontal scan of which depends on the slant range. Thus this latter potential is permitted to intensify the cathode ray beam only at a time in the vertical scan which corresponds to the time of concurrence of the gate pulses yielding a second intensified mark which by means of suitable calibration of the cathode ray tube screen provides information as to target height and the angle the antenna is required to rotate between the illumination of a target by the vertical beam and the illumination of the same target by the slant beam of a V-beam radar instrument.

What is claimed is:

1. A V-beam radar simulator comprising, means for generating a first potential the magnitude of which is proportional to the slant range of a simulated target, a cathode ray tube including an intensifying electrode and having deflection circuits for scanning said cathode ray tube in mutually perpendicular directions, a sawtooth voltage generator for providing a scanning potential for one of said deflection circuits, means including said scanning potential and said first potential for generating a train of pulses the time of occurrence of which with respect to deflection of the cathode ray beam in one direction is proportional to the magnitude of said first potential, means for generating an antenna azimuth potential the phase of which varies in proportion to the constantly changing angle of a simulated radar antenna, means for generating a target direction potential the magnitude of which is proportional to the ground range and the phase of which is proportional to the azimuth of a simulated target, means for deriving a height potential from said antenna azimuth potential the magnitude of which is proportional to the height of said simulated target, means for producing a vector sum potential from said target direction potential and a potential whose magnitude is equal to said height potential and whose phase is advanced 90° with respect thereto, and means for inhibiting imposition of the pulses of said train of pulses on said intensifying electrode except during those intervals in which said vector sum potential bears a selected phase relation with respect to said antenna azimuth potential.

2. A V-beam radar simulator as defined in claim 1 in which the other of said deflection circuits has a scanning potential applied thereto, the instantaneous magnitude of which is proportional to the instantaneous angular position of said simulated radar antenna.

3. A V-beam radar simulator comprising means for producing a target direction potential whose magnitude is proportional to the ground range and whose phase is proportional to the azimuth of a simulated target, means for producing an antenna azimuth potential whose phase varies in proportion to the constantly changing direction of a simulated radar antenna, means for deriving from said antenna azimuth potential a height potential of equivalent phase and having a magnitude proportional to the height of said simulated target, means for deriving from said target direction potential and said height potential a vector sum potential whose magnitude and phase are proportional to the vector sum of said target direction potential and a potential having the magnitude of said height potential and a phase in quadrature thereto, means for deriving from said target direction potential and said height potential a slant range potential the magnitude of which is proportional to the slant range of said simulated target, a cathode ray tube including an intensifying electrode and having horizontal and vertical deflecting means associated therewith, means for generating pulse signals whose time of occurrence relative to the scan of the beam of said cathode ray tube in one direction is dependent on the magnitude of said slant range potential, a circuit for impressing said pulse signals on said intensifying electrode, and means included in said circuit for preventing the transmission of said pulse signals therethrough except in those intervals during which said vector sum potential bears a selected phase relation to said antenna azimuth potential.

4. A V-beam radar simulator comprising, means for producing a target direction potential whose magnitude is proportional to the ground range and whose phase is proportional to the azimuth of a simulated target, means for producing an antenna azimuth potential whose phase varies in proportion to the constantly changing direction of a simulated radar antenna, means for deriving from said antenna azimuth potential a height potential of equivalent phase and having a magnitude proportional to the height of said simulated target, means for deriving from said target direction potential and said height potential a vector sum potential whose magnitude and phase are proportional to the vector sum of said target direction potential and a potential having the magnitude of said height potential and in phase quadrature thereto, means for deriving from said target direction potential and said height potential a slant range potential the magnitude of which is proportional to the slant range of said simulated target, a cathode ray tube including an intensifying electrode and having horizontal and vertical deflecting means associated therewith, means for generating pulse signals whose time of occurrence relative to the scan of the beam of said cathode ray tube in one direction is dependent on the magnitude of said slant range potential, a first circuit for impressing said pulse signals on said intensifying electrode, means included in said first circuit for inhibiting the transmission of said pulse signals therethrough except in those intervals during which said vector sum potential bears a selected phase relation to said antenna azimuth potential, a second circuit for impressing said pulse signals on said intensifying electrode, and means included in said second circuit for inhibiting the transmission of said pulse signals therethrough except in those intervals during which said antenna azimuth potential and said target direction potential have the same phase displacement as respects each other.

5. A V-beam radar simulator as defined in claim 4 in which means is provided to scan the beam of said cathode ray tube in the other direction in timed relation to the angular position of said simulated radar antenna, said means including calibrated means for adjusting the time of initiation of said scan in relation to the instantaneous angular position of said simulated radar antenna.

6. A V-beam radar simulator comprising, means for producing a target direction potential whose magnitude is proportional to the ground range and whose phase is proportional to the azimuth of a simulated target, means for producing an antenna azimuth potential whose phase varies in proportion to the constantly changing direction of a simulated radar antenna, means for deriving from said antenna potential a height potential of equivalent phase which has a magnitude proportional to the height of said simulated target, means for deriving from said target direction potential and said height potential a vector sum potential whose magnitude and phase are proportional to the vector sum of said target direction potential and a potential having the magnitude of said height potential and in phase quadrature thereto, phase converting means for causing said target direction potential and said height potential to agree in phase, means energized by said similarly phased target direction potential and height potential for adding said potentials in phase quadrature producing from such addition a slant range potential the magnitude of which is proportional to the slant range of said simulated target, a cathode ray tube including an intensifying electrode and having horizontal and vertical deflecting means associated therewith, means for generating pulse signals whose time of occurrence relative to the scan of the beam of said cathode ray tube in one direction is dependent on the magnitude of said slant range potential, a circuit for impressing said pulse signals on said intensifying electrode, and means included in said circuit for inhibiting the transmission of said pulse signals therethrough except in those intervals during which said vector sum potential bears a selected phase relation to said antenna azimuth potential.

7. A V-beam radar simulator comprising, means for producing a target direction potential whose magnitude is proportional to the ground range and whose phase is proportional to the azimuth of a simulated target, means for producing an antenna azimuth potential whose phase varies in proportion to the constantly changing direction of a simulated radar antenna, means for deriving from said antenna potential a height potential of equivalent phase which has a magnitude proportional to the height of said simulated target, means for deriving from said target direction potential and said height potential a vector sum potential whose magnitude and phase are proportional to the vector sum of said target direction potential and a potential having the magnitude of said height potential and in phase quadrature thereto, phase converting means for causing said target direction potential and said height potential to agree in phase, means energized by said similarly phased target direction potential and height potential for adding said potentials in phase quadrature producing from such addition a slant range potential the magnitude of which is proportional to the slant range of said simulated target, a cathode ray tube including an intensifying electrode and having horizontal and vertical deflecting means associated therewith, means for generating pulse signals whose time of occurrence relative to the scan of the beam of said cathode ray tube in one direction is dependent on the magnitude of said slant range potential, a first circuit for impressing said pulse signals on said intensifying electrode, means included in said first circuit for inhibiting the transmission of said pulse signals therethrough except in those intervals during which said vector sum potential bears a selected phase relation to said antenna azimuth potential, a second circuit for impressing said pulse signals on said intensifying electrode and means included in said second circuit for inhibiting the transmission of said pulse signals therethrough except in those intervals during which said antenna azimuth potential and said target direction potential have the same phase displacement as respects each other.

8. A V-beam radar simulator as defined in claim 7 in which means is provided to scan the beam of said cathode ray tube in the other direction in timed relation to the angular position of said simulated radar antenna, said means including calibrated means for adjusting the time of initiation of said scan in relation to the instantaneous angular position of said simulated radar antenna.

9. A V-beam radar simulator comprising, means for producing a target direction potential whose magnitude is proportional to the ground range and whose phase is proportional to the azimuth of a simulated target, means for producing an antenna azimuth potential whose phase varies in proportion to the constantly changing direction of a simulated radar antenna, means for deriving from said antenna potential a height potential of equivalent phase which has a magnitude proportional to the height of said simulated target, means for deriving from said target direction potential and said height potential a vector sum potential whose magnitude and phase are proportional to the vector sum of said target direction potential and a potential having the magnitude of said height potential and in phase quadrature thereto, phase converting means for causing said target direction potential and said height potential to agree in phase, means energized by said similarly phased target direction potential and height potential for adding said potentials in phase quadrature producing from such addition a slant range potential the magnitude of which is proportional to the slant range of said simulated target, a cathode ray tube including an intensifying electrode and having horizontal and vertical deflecting means associated therewith, means for generating pulse signals whose time of occurrence relative to the scan of the beam of said cathode ray tube in one direction is dependent on the magnitude of said slant range potential, gate generating means generating first gate signals whose time of occurrence is determined by the phase of said vector sum potential, gate generating means for generating second gate signals whose time of occurrence is determined by the phase of said antenna azimuth potential, a circuit for impressing said pulse signals on said intensifying electrode, said circuit includes a coincidence circuit preventing the transmission of energy therethrough at all times except on the mutual simultaneous occurrence of said pulse signals and said first and second gate signals.

10. A V-beam radar simulator comprising, means for producing a target direction potential whose magnitude is proportional to the ground range and whose phase is proportional to the azimuth of a simulated target, means for producing an antenna azimuth potential whose phase varies in proportion to the constantly changing direction of a simulated radar antenna, means for deriving from said antenna potential a height potential of equivalent phase which has a magnitude proportional to the height of said simulated target, means for deriving from said target direction potential and said height potential a vector sum potential whose magnitude and phase are proportional to the vector sum of said target direction potential and a potential having the magnitude of said height potential and in phase quadrature thereto, phase converting means for causing said target direction potential and said height potential to agree in phase, means energized by said similarly phased target direction potential and height potential for adding said potentials in phase quadrature producing from such addition a slant range potential the magnitude of which is proportional to the slant range of said simulated target, a cathode ray tube including an intensifying electrode and having horizontal and vertical deflecting means associated therewith, means for generating pulse signals whose time of occurrence relative to the scan of the beam of said cathode ray tube in one direction is dependent on the magnitude of said slant range potential, gate generating means generating first gate signals whose time of occurrence is determined by the phase of said vector sum potential, gate generating means generating second gate signals whose time of occurrence is determined by the phase of said antenna azimuth potential, a first circuit for impressing said pulse signals on said intensifying electrode, said circuit including a coincidence circuit preventing the transmission of energy therethrough at all times except on the mutual simultaneous occurrence of said pulse signals and said first and second gate signals, gate generating means generating third gate signals whose time of occurrence is determined by the phase of said antenna azimuth potential, gate generating means generating fourth gate signals whose time of occurrence is determined by the phase of said target direction potential, a second circuit for impressing said pulse signals on said intensifying electrode said second circuit including a coincidence circuit preventing the transmission of energy therethrough at all times except on the mutual simultaneous occurrence of said pulse signals and said third and fourth gate signals.

References Cited in the file of this patent
UNITED STATES PATENTS

| | | |
|---|---|---|
| 2,471,439 | Melvin | May 31, 1949 |
| 2,555,442 | Hales | June 5, 1951 |
| 2,602,243 | Link | July 8, 1953 |
| 2,663,648 | Amman | Apr. 7, 1953 |